(12) United States Patent
Gillenberg et al.

(10) Patent No.: US 8,152,876 B2
(45) Date of Patent: Apr. 10, 2012

(54) FILTER ELEMENT HAVING V-SEAL

(75) Inventors: Eric Gillenberg, Speyer (DE);
Klaus-Dieter Ruhland, Meckenheim (DE); Oliver Steins, Römerberg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 107 days.

(21) Appl. No.: 12/681,335

(22) PCT Filed: Oct. 2, 2008

(86) PCT No.: PCT/EP2008/063222
§ 371 (c)(1),
(2), (4) Date: Jun. 21, 2010

(87) PCT Pub. No.: WO2009/047204
PCT Pub. Date: Apr. 16, 2009

(65) Prior Publication Data
US 2010/0275559 A1    Nov. 4, 2010

(30) Foreign Application Priority Data
Oct. 2, 2007   (DE) .................... 20 2007 014 821 U

(51) Int. Cl.
*B01D 50/00*  (2006.01)
(52) U.S. Cl. ............. 55/337; 55/385.3; 55/490; 55/498; 55/495; 55/502; 55/503; 55/504; 55/510; 210/248; 210/440; 210/450; 210/483
(58) Field of Classification Search .................. 55/337, 55/498, 385.3, 490, 502, 495, 503, 504, 510; 210/248, 440, 450, 483
See application file for complete search history.

(56) References Cited

U.S. PATENT DOCUMENTS

| | | | | |
|---|---|---|---|---|
| 5,413,712 | A | * | 5/1995 | Gewiss et al. ................ 210/450 |
| 5,487,767 | A | * | 1/1996 | Brown ............................. 55/357 |
| 5,569,311 | A | * | 10/1996 | Oda et al. ........................ 55/493 |

(Continued)

FOREIGN PATENT DOCUMENTS

DE    4032499    4/1992
(Continued)

OTHER PUBLICATIONS

PCT Search report of PCT/EP2008/063222; German patent office search of DE 20 2007 014 821.6.

*Primary Examiner* — Jason M Greene
*Assistant Examiner* — Dung Bui
(74) *Attorney, Agent, or Firm* — James Hasselbeck

(57) ABSTRACT

The invention relates to a filter element, consisting of a filter medium (10) that is pleated in a zigzag manner and has a concentric form, and an end disk (11) disposed on a front, and a second end disk (12) disposed on the opposite front, wherein the end disk (12) has a concentric opening (13) and extends substantially annularly across the pleats of the filter medium. The end disk (12) has a ring collar (14) extending radially toward the outside. The ring collar (14) has a seal (15) that surrounds the ring collar at least partially, wherein the seal has an axially extending region, which carries radially peripheral sealing lips (17), and said radially peripherals sealing lips are supported in a groove (18) or in a housing wall (19) of a housing receiving the filter element.

7 Claims, 2 Drawing Sheets

U.S. PATENT DOCUMENTS

| | | | | |
|---|---|---|---|---|
| 5,702,602 | A * | 12/1997 | Brown et al. | 210/342 |
| 5,730,769 | A * | 3/1998 | Dungs et al. | 55/385.3 |
| 5,755,843 | A * | 5/1998 | Sundquist | 55/385.3 |
| 5,893,937 | A * | 4/1999 | Moessinger | 55/385.3 |
| 5,954,849 | A * | 9/1999 | Berkhoel et al. | 55/498 |
| 6,179,890 | B1 * | 1/2001 | Ramos et al. | 55/482 |
| 6,308,836 | B1 * | 10/2001 | Guichaoua et al. | 210/440 |
| 6,447,567 | B1 * | 9/2002 | Ehrenberg | 55/498 |
| 6,543,625 | B1 | 4/2003 | Le Roux et al. | |
| 6,598,580 | B2 * | 7/2003 | Baumann et al. | 123/198 E |
| 6,599,342 | B2 * | 7/2003 | Andress et al. | 55/495 |
| 6,610,126 | B2 * | 8/2003 | Xu et al. | 95/273 |
| 6,936,162 | B1 * | 8/2005 | McKenzie | 210/130 |
| 6,966,940 | B2 * | 11/2005 | Krisko et al. | 55/497 |
| 6,972,092 | B1 * | 12/2005 | Roll | 210/313 |
| 7,303,673 | B1 * | 12/2007 | Glazewski | 210/232 |
| 7,318,851 | B2 * | 1/2008 | Brown et al. | 55/498 |
| 7,393,375 | B2 * | 7/2008 | Xu et al. | 55/495 |
| 7,396,376 | B2 * | 7/2008 | Schrage et al. | 55/498 |
| 7,396,377 | B2 * | 7/2008 | Lampert et al. | 55/502 |
| 7,491,254 | B2 * | 2/2009 | Krisko et al. | 55/337 |
| 7,608,184 | B2 * | 10/2009 | Weindorf et al. | 210/234 |
| 7,658,777 | B2 * | 2/2010 | Kopec et al. | 55/502 |
| 7,662,203 | B2 * | 2/2010 | Scott et al. | 55/498 |
| 2002/0100720 | A1 * | 8/2002 | Jainek | 210/248 |
| 2002/0112459 | A1 * | 8/2002 | Andress et al. | 55/498 |
| 2003/0121242 | A1 * | 7/2003 | Rieger et al. | 55/493 |
| 2005/0173328 | A1 * | 8/2005 | Gutman et al. | 210/232 |
| 2005/0194312 | A1 * | 9/2005 | Niemeyer et al. | 210/634 |
| 2005/0229561 | A1 * | 10/2005 | Nepsund et al. | 55/481 |
| 2005/0229563 | A1 | 10/2005 | Holzmann et al. | |
| 2006/0091061 | A1 * | 5/2006 | Brown | 210/440 |
| 2006/0091064 | A1 * | 5/2006 | Brown et al. | 210/450 |
| 2006/0137316 | A1 * | 6/2006 | Krull et al. | 55/498 |
| 2006/0157394 | A1 * | 7/2006 | Luka et al. | 210/136 |
| 2006/0219626 | A1 * | 10/2006 | Dworatzek et al. | 210/443 |
| 2007/0170101 | A1 * | 7/2007 | Stanhope et al. | 210/130 |
| 2007/0186528 | A1 * | 8/2007 | Wydeven et al. | 55/498 |
| 2007/0193929 | A1 * | 8/2007 | Brown et al. | 210/90 |
| 2007/0235374 | A1 * | 10/2007 | Wright et al. | 210/130 |
| 2007/0235375 | A1 * | 10/2007 | Stanhope et al. | 210/130 |
| 2008/0035537 | A1 * | 2/2008 | Klein et al. | 210/94 |
| 2008/0066435 | A1 * | 3/2008 | Engel et al. | 55/492 |
| 2008/0110142 | A1 * | 5/2008 | Nelson et al. | 55/357 |
| 2008/0276583 | A1 * | 11/2008 | Munkel | 55/498 |
| 2010/0032359 | A1 * | 2/2010 | Gillenberg et al. | 210/232 |
| 2010/0044295 | A1 * | 2/2010 | Honermann et al. | 210/234 |

FOREIGN PATENT DOCUMENTS

| | | |
|---|---|---|
| DE | 19806929 | 8/1998 |
| DE | 10003993 | 8/2001 |
| DE | 10020538 | 10/2001 |
| DE | 10354400 | 9/2004 |
| DE | 102005016841 | 11/2005 |
| EP | 0897317 | 2/1999 |
| EP | 1216740 | 6/2002 |
| FR | 2762229 | 7/1997 |
| FR | 2787036 | 6/2000 |
| GB | 2383002 | 6/2003 |
| WO | WO2006012386 | 2/2006 |
| WO | WO2008134494 | 11/2008 |

* cited by examiner

FILTER ELEMENT HAVING V-SEAL

CROSS REFERENCE TO RELATED APPLICATIONS

This application is US National Stage Entry of international patent application no. PCT/EP2008/063222, filed Oct. 2, 2008 designating the United States of America, the entire disclosure of which is incorporated herein by reference. Priority is claimed based on Federal Republic of Germany patent application no. 20 2007 014 821.6, filed Oct. 2, 2007.

TECHNICAL FIELD

The invention concerns a filter element and a filter system, especially for the intake air of an internal combustion engine.

PRIOR ART

U.S. Pat. No. 4,720,292 discloses an air filter having the following features: a housing with an axial outlet opening and a substantially open second end that is closable by a removable cover. On the circumference of the housing an air inlet opening is arranged. In the housing, there is a substantially cylindrical filter element with an internal support tube, a filter with an external support tube, wherein the filter element is coaxially arranged in the housing. The sealing action of the filter element on the housing is realized by an annular end plate that has a substantially cylindrical radially inwardly oriented surface and is pushed over an inner section of the outlet part.

It is well known that the filter inserts of air filters are exchanged after a certain operating time. Depending on the dust load, the service life of an air filter can be a few days (construction machinery) up to several months.

The filter insert disclosed in the aforementioned U.S. patent as well as other conventionally employed filter inserts are comprised of a combination of materials wherein in particular for the support tubes sheet steel is used. The filter medium is paper or a plastic nonwoven fabric. The end plates are comprised of plastic material, for example, of a soft elastomer.

Especially in case of frequent exchange of filter elements the reliable and process-safe sealing action of the filter element in a housing is important. The sealing action should be temperature-resistant and vibration-resistant. Even in facilities or devices that are exposed to strong vibrations or shocks, the sealing action of the filter element must be ensured. At the same time, the filter element itself however should have, if possible, no metallic elements so that it can be disposed of thermally without problems.

The invention has therefore the object to provide a filter element and a filter system with a high filtration property and a reliable sealing action between the area of the unfiltered and the area of the filtered medium. This object is solved by the features of the independent claim.

The decisive advantage of the invention resides in that by the configuration of the seal of the filter element in the form of an annular collar and a seal that encloses or at least partially encloses the annular collar it is ensured that, on the one hand, a high sealing action and, on the other hand, a support of the filter element in a housing is provided. Especially when using plastic material and when sealing vibration-loaded elements a design is required that functions reliably even in case of extreme temperature fluctuations.

According to one embodiment of the invention, the end plate that supports the seal is comprised of thermoplastic material. Of course, there is also the possibility of producing the end plate of another material or of several components, for example, by an in-mold assembly injection molding process. In this connection, the component that forms the seal is comprised of an elastomer and the component that produces the connection to the filter medium is a hard plastic material. The latter can be welded or glued to the filter medium.

In another embodiment of the invention, it is proposed to attached a dust protection seal to the lip. This seal ensures that no dust can reach the sealing lips, also not the surface where the sealing lips rest. In this way, it is prevented that in case of vibrations or friction the sealing connection is endangered as a result of dust introduction.

A further embodiment provides that the seal is supported on the stays within the area of the receiving groove for the seal. The stays in this connection exert a force onto the annular collar in such a way that the sealing lips are reliably resting against the housing wall of the filter housing.

The invention concerns also a filter system with a filter element. This filter system serves especially for filtration of intake air of an internal combustion engine and is comprised of a housing and a cover for receiving the filter element.

The end plates can be produced also by a thixotropic application method. This means a metered application of the thixotropic material wherein simultaneously the sealing structure is formed without additional molds.

In an advantageous way, the filter system is provided with an annular groove which in the area of the sealing action communicates with the sealing contour of the filter element.

According to a further embodiment, on the housing in the area of the inlet a cyclone or a rotary flow separator is provided. It is comprised of guide ribs that impart a rotational movement or rotation to the medium. By means of this rotation the dirt is guided outwardly and is removed at a suitable location by means of a dirt outlet.

These and further features not only can be taken from the claims but also from the figures.

BRIEF DESCRIPTION OF THE DRAWINGS

The invention will be explained in the following with the aid of an embodiment in more detail. It is shown in.

EMBODIMENT(S) OF THE INVENTION

Figure 1:
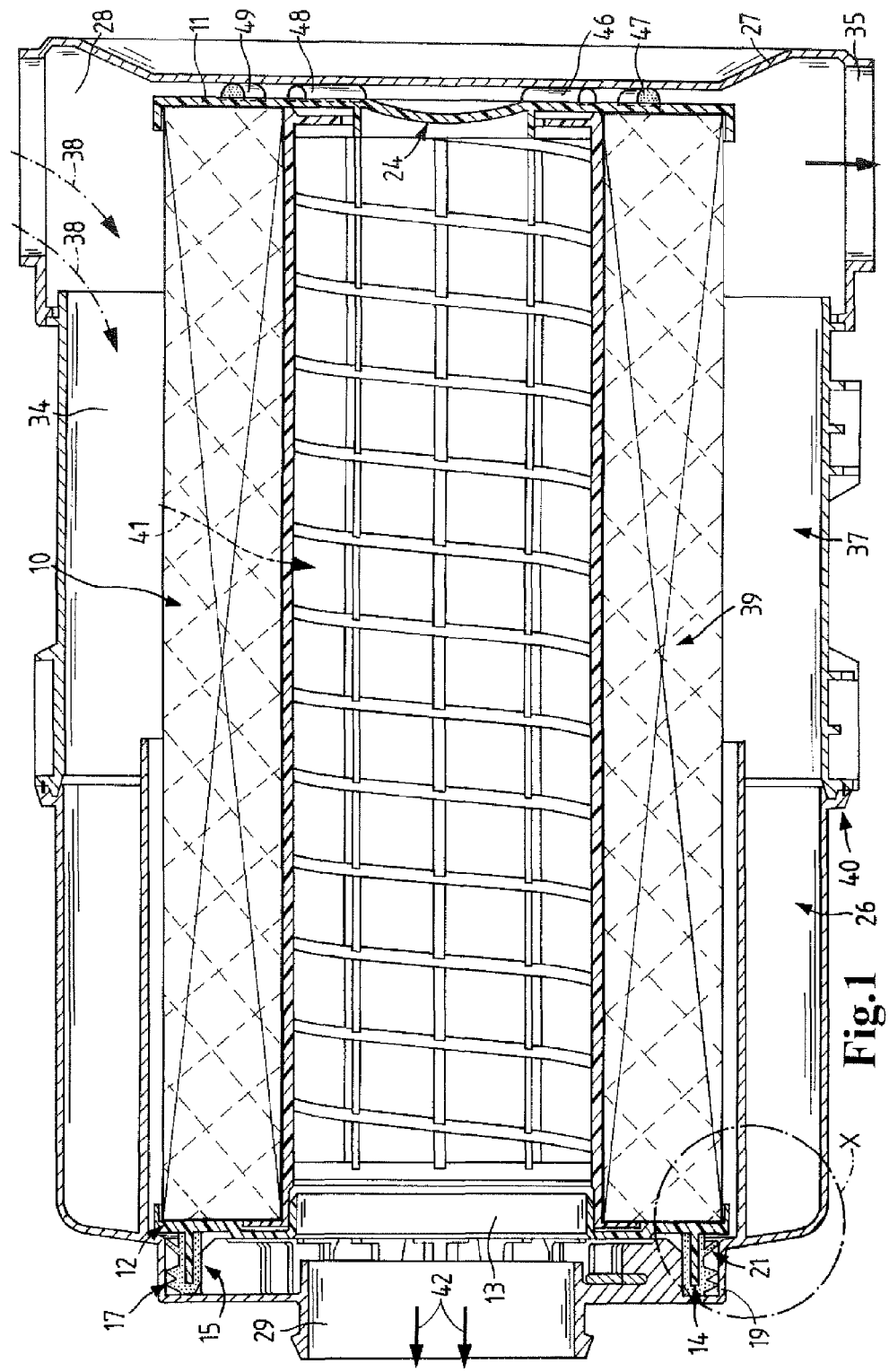
FIG. 1 a section view of a filter system.

The filter system according to FIG. 1 is comprised of a housing 26 that is substantially concentrically configured and has an inlet 28. The filter system serves for filtration of the intake air of an internal combustion engine. Through the inlet 28 the air to be purified is supplied according to arrow 38, flows through the cyclone preseparator 34 and a rotary flow is imparted thereby. As a result of this rotary flow particles that are contained in the air reach the housing wall and are carried from there to the exterior through a dirt outlet 35 that may be closed off by a suitable valve.

On the housing 26 a middle section 37 is arranged. The latter is also designed concentrically and is coupled to the housing in the area 40, for example, by means of a weld. On the middle section 37 there is a cover 27. The latter is detachably connected to the middle section by means of clamping closures or another suitable closure system. Cover, middle section, and housing together thus provide a closed system that has an outlet 29 for discharging the purified air.

Inside the entire system there is a filter element 39. The latter is comprised of a zigzag-folded filter medium 10 and is of a concentric shape. The end faces of the filter element 39 have end plates 11, 12. While one end plate 12 has a concentric opening 13, the other end plate 11 is provided with a closure member 24. The air to be purified flows according to arrow 41 through the filter element and, purified, according to arrow 42 through the outlet 29 to an internal combustion engine, not illustrated here.

Figure 2:
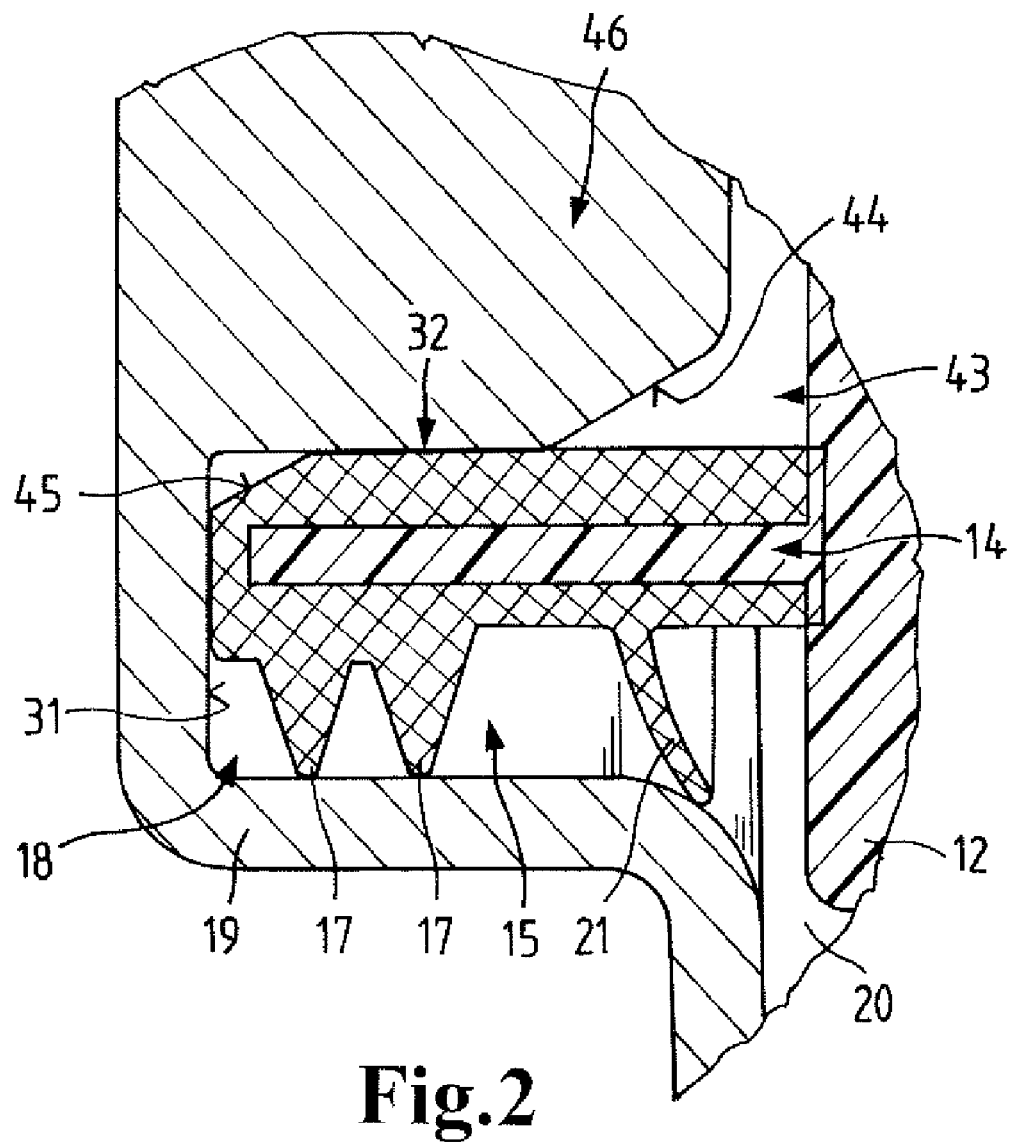
FIG. 2 a detail illustration in the sealing area of the filter housing.

The filter element has at the end plate 12 arranged to the left an annular collar 14. As shown in FIG. 1 and FIG. 2, on this collar there is a seal 15 that surrounds the annular collar completely. This seal is pushed onto the annular collar or is injection-molded integrally onto the annular collar by a two-component injection molding process. The seal has outwardly extending sealing lips 17. The sealing lips have arranged upstream thereof a dust protection lip 21 that separates the area 20 loaded with dust from the sealing area. The sealing lips extend concentrically along the housing wall 19 and form together with the housing wall 19 the sealing action relative to the raw air area (area 20) and the clean air area 43.

The annular groove 31 which ultimately receives the sealing system is provided with stays 21 on the side that is opposite the housing wall 19. These stays extends axially and form thus a slotted support edge for the seal 15. At the same time, the stays produce a force on the annular collar 14 that is oriented radially outwardly and therefore increases the sealing action.

The filter element is inserted axially into the housing. This means that the seal must glide along the stays 21. For improving positioning and movement into the nominal position a circumferentially extending guide edge 44 is provided that in connection with the slanted portion 45 provides for an easy insertion of the seal into the groove 18.

The end plate 11 is provided with support elements 46, 47, 48, 49 that are resting against the cover 27 and ensure a defined mounted position of the filter element in the housing.

The invention claimed is:

1. A filter element, comprising: a zigzag-folded filter medium (10) arranged in a tubular concentric shape; a first end plate (11) arranged at an axial end face of said concentric filter medium, said first end plate having a central portion that is either open or closed; and a second end plate (12) arranged at an opposing axial end face of said filter medium; an annular collar (14) extending axially outwardly from said second end plate (12); a seal arranged on and at least partially surrounding said annular collar, said seal having an axially extending area; and at least one seal lip (17) arranged on said axially extending area of said seal, said seal lips concentrically arranged and extending radially outwards from said seal, said seal lips configured to be received into a groove (18) in wall (19) of a housing receiving said filter element; wherein said seal further includes at least one radially and circumferentially extending dust protection lip (21), said dust protection lip arranged axially inwardly from said at least one sealing lip (17), said sealing lip operative to isolate said at least one sealing lip (17) from a dust load area (20) of said housing receiving said filter element.

2. The filter element according to claim 1, wherein said end plate (12) is comprised of a thermoplastic material and is connected to the filter medium by plastic welding or gluing.

3. The filter element according to claim 1 wherein
said seal (15) arranged on said annular collar is supported on stays (21) of said housing receiving said filter element.

4. The filter element according to claim 1, wherein
said end plate (12) and said seal (15) are produced by a two-component injection molding process.

5. A filter system comprising
a filter element according to claim 1, said filter system further comprising:
a housing (26) that is substantially concentrically configured relative to said filter element and configured to receive said filter element therein;
a cover (27) closing off the housing (26) and also concentrically configured;
an inlet (28) arranged on the housing and/or the cover, said inlet configured to supply a medium to be filtered to said filter element;
an outlet concentrically arranged on said housing (20) and configured to discharge filtered medium; and
a sealing contour arranged in said housing in an area proximate to said outlet (29), said sealing contour having a contour matching said annular collar (14) and said seal (15) to provide a sealing action between said seal and said sealing contour.

6. The filter system according to claim 5, wherein
said sealing contour is comprised of a concentrically extending annular groove (31); and
wherein said annular groove in a radially inboard area (32) of said groove is stay shaped and said stay shaped groove area extends axially.

7. The filter system according to claim 5, further comprising:
a cyclone preseparator arranged inside said housing between said inlet (28) and said filter element; and
a dirt outlet (35) is arranged on said housing (26) or said cover (27).

\* \* \* \* \*